United States Patent [19]

Kobayashi et al.

[11] Patent Number: 4,665,832
[45] Date of Patent: May 19, 1987

[54] VEHICLE TRANSFER SYSTEM

[75] Inventors: Masafumi Kobayashi; Hiroyasu Nagaoka; Hiroshi Hayakawa; Masamiti Kogai, all of Hiroshima, Japan

[73] Assignee: Mazda Motor Corporation, Hiroshima, Japan

[21] Appl. No.: 789,027

[22] Filed: Oct. 18, 1985

[30] Foreign Application Priority Data

Oct. 22, 1984 [JP] Japan .......................... 59-159576[U]
Oct. 22, 1984 [JP] Japan .......................... 59-159577[U]

[51] Int. Cl.$^4$ .......................................... B61B 13/12
[52] U.S. Cl. ..................................... 104/165; 104/48; 198/468.1; 198/468.6
[58] Field of Search ............ 104/48, 162, 165, 172 B, 104/176; 198/463.3, 483.1, 576, 605, 610, 750, 468.1, 468.6, 614

[56] References Cited

U.S. PATENT DOCUMENTS

| 2,501,473 | 3/1950 | Malvicini | 198/483.1 X |
| 2,931,316 | 4/1960 | Blackwell | 104/48 X |
| 4,010,843 | 3/1977 | Lucas | 198/468.6 |

FOREIGN PATENT DOCUMENTS 1247215 8/1967 Fed. Rep. of Germany ... 198/463.3
57-18520 3/1982 Japan .
2085389 4/1982 United Kingdom .............. 198/605
569493 9/1977 U.S.S.R. ........................ 104/172 B Primary Examiner—Randolph A. Reese
Attorney, Agent, or Firm—Gerald J. Ferguson, Jr.; Michael P. Hoffman; Ronni S. Malamud

[57] ABSTRACT

A vehicle transfer system for use in a vehicle assembly line comprises a first conveyor which transfers a vehicle while supporting the vehicle on its chassis with the tires being floated, and a second conveyor which transfers the vehicle body while supporting the vehicle on its tires. A ride-over table is disposed between the first and second conveyors so that the tires of the vehicle are caused to ride over the ride-over table and the chassis is lifted away from the vehicle supporting table of the first conveyor. A movable receiving table is disposed on the receiving side of the second conveyor to be movable back and forth in parallel to the second conveyor and is moved forward in synchronization with the first conveyor. The movable receiving table is further movable between a raised position in which it lifts the vehicle riding over the ride-over table before the vehicle reaches the delivery side end of the ride-over table and a lowered position in which it lowers the vehicle passing over the ride-over table onto the second conveyor.

9 Claims, 10 Drawing Figures

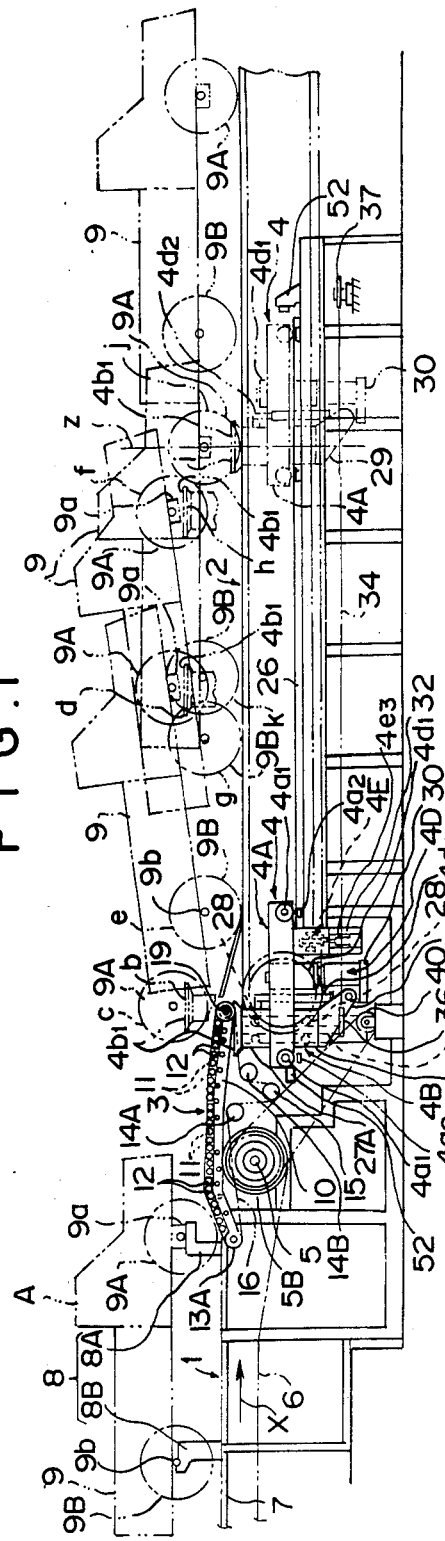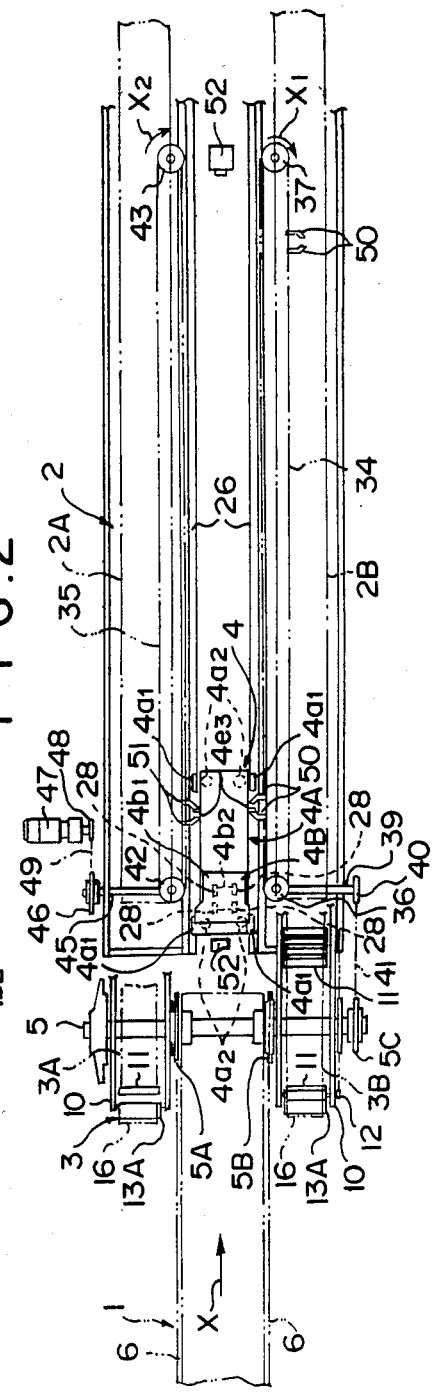
FIG.1
FIG.2

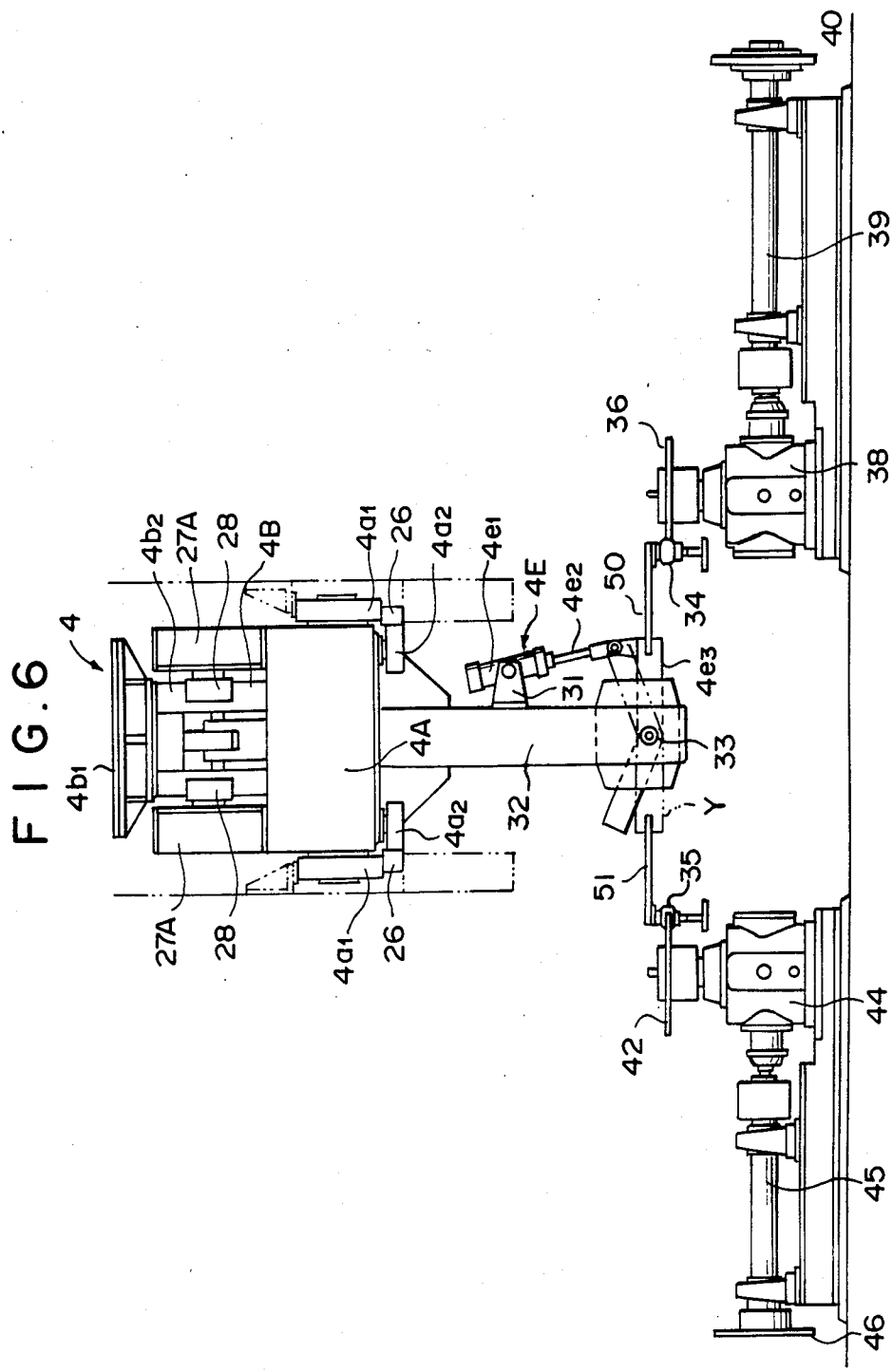

VEHICLE TRANSFER SYSTEM

BACKGROUND OF THE INVENTION

1. Field of the Invention

This invention relates to a vehicle transfer system for use in a vehicle assembly line.

2. Description of the Prior Art

There has been known a vehicle transfer system for use in a vehicle assembly line comprising a first conveyor (a single slat conveyor) which transfers a vehicle while supporting the vehicle on its chassis with the tires being floated, a second conveyor (a double slat conveyor) which transfers the vehicle body while supporting the vehicle on its tires, and a ride-over table disposed between the first and second conveyors which the tires of the vehicle are caused to ride over so that the chassis is lifted away from the vehicle supporting table of the first conveyor. When the front tires of the vehicle transferred by the first conveyor reach the ride-over table, they ride over an ascending slope formed on the receiving side of the ride-over table and roll up on the slope. Thereby, the front portion of the chassis is lifted above the vehicle supporting table of the first conveyor. Thereafter, the front tires roll on a substantially horizontal top surface of the ride-over table and by the time the front tires approach the delivery side of the ride-over table, the rear tires have rolled up on the ascending slope to the substantially horizontal top surface. When the vehicle further advances, the front tires roll down a descending slope formed on the delivery side of the ride-over table into the receiving side of the second conveyor, and thereafter the rear tires roll down the descending slope into the receiving side of the second conveyor.

Thus, in the conventional vehicle transfer system, the vehicle is transferred to the second conveyor from the ride-over table by causing the vehicle to run on the descending slope and accordingly the vehicle runs on the second conveyor by inertia. Therefore, when the vehicles are transferred to the second conveyor, the transfer intervals at which the vehicles are transferred and which has been fixed on the first conveyor fluctuate, adversely affecting various operations to be carried out along the second conveyor.

Therefore, conventionally, an operator must ride on each vehicle before the vehicle reaches the ride-over table and brake the vehicle to adjust the transfer intervals after the vehicle runs into the second conveyor. However, there have been problems that it is impossible for the operator to precisely adjust the transfer intervals and at the same time, a plurality of operators are required exclusively for this purpose.

Further in the conventional vehicle transfer systems, there has been a problem that the vehicle is apt to be displaced in the direction perpendicular to the transfer direction if the front tires are turned right or left when the front tires ride over the ascending slope of the ride-over table or when the vehicle rolls down the descending slope of the same to the second conveyor.

SUMMARY OF THE INVENTION

In view of the foregoing observations and description, the primary object of the present invention is to provide a vehicle transfer system for use in a vehicle assembly line which includes a first conveyor for transferring a vehicle while supporting the vehicle on its chassis with the tires being floated, and a second conveyor for transferring the vehicle body while supporting the vehicle on its tires, and in which the vehicles can be transferred at fixed transfer intervals.

The vehicle transfer system in accordance with the present invention comprises a first conveyor which transfers a vehicle while supporting the vehicle on its chassis with the tires being floated, a second conveyor which transfers the vehicle body while supporting the vehicle on its tires, a ride-over table disposed between the first and second conveyors which the tires of the vehicle are caused to ride over so that the chassis is lifted away from the vehicle supporting table of the first conveyor, and a movable receiving table which is disposed on the receiving side of the second conveyor to be movable back and forth in parallel to the second conveyor and is moved forward in synchronization with the first conveyor, the movable receiving table being further movable between a raised position in which it lifts the vehicle riding over the ride-over table before the vehicle reaches the delivery side end of the ride-over table and a lowered position in which it lowers the vehicle passing over the ride-over table onto the second conveyor.

In one preferred embodiment of the present invention, at least the part of the ride-over table at which the tires of the vehicle ride over the ride-over table is formed of a conveyor which runs in synchronization with the first conveyor so that the tires cannot roll on the ride-over table.

In this embodiment, the vehicle cannot be displaced in the direction perpendicular to the transverse direction of the vehicle even if the front tires are turned right or left since the front tires cannot roll during transfer.

BRIEF DESCRIPTION OF THE DRAWINGS

FIG. 1 is a side view of a vehicle transfer system in accordance with an embodiment of the present invention, FIG. 2 is a plan view of the same, FIG. 6 is a fragmentary view for illustrating the relation between the running direction changing mechanism and the driving chains.

DESCRIPTION OF THE PREFERRED EMBODIMENT

Figure 3:
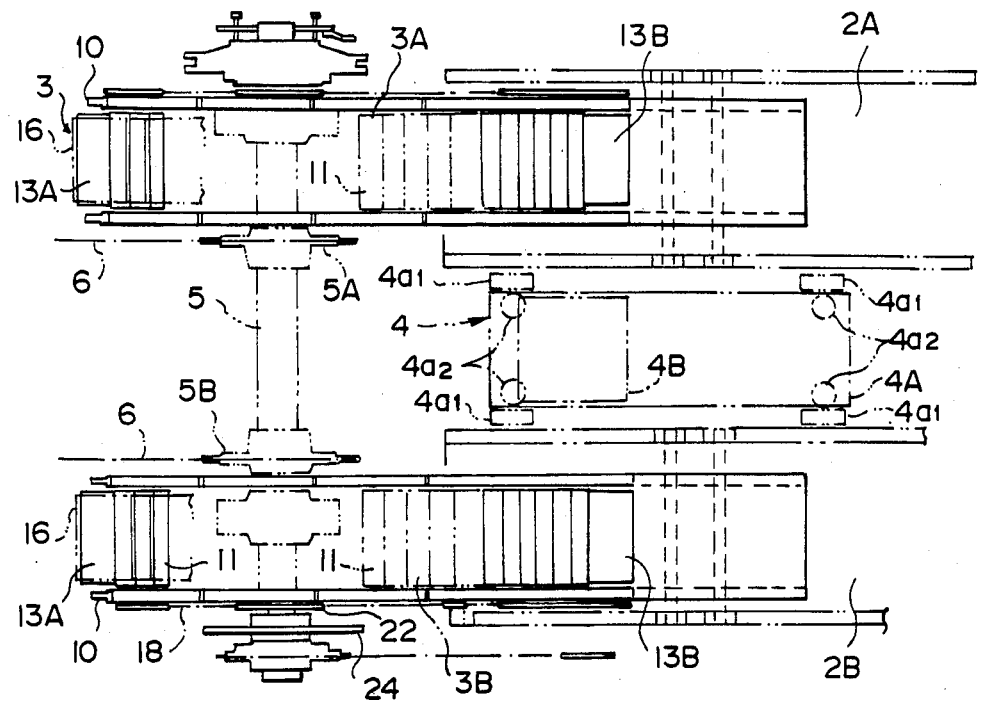
FIG. 3 is a plan view of the ride-over table employed in the vehicle transfer system of FIGS. 1 and 2.

In FIGS. 1 and 2, a vehicle transfer system in accordance with a first embodiment of the present invention comprises a first conveyor 1, a second conveyor 2, a ride-over table 3 and a movable receiving table 4.

The first conveyor 1 is a single-slat conveyor and is provided with a driving shaft 5 which is driven in the clockwise direction as seen in FIG. 1 by a driving mechanism (not shown). A pair of driving sprockets 5A and 5B are attached to the driving shaft 5 and a pair of chains 6 are respectively engaged with the driving sprockets 5A and 5B. Each of the chains 6 runs on a rail 7 in the direction of arrow X.

The first conveyor 1 is provided with a plurality of vehicle supporting table means 8 spaced from each other at given intervals in the transfer direction. Each vehicle supporting table means 8 supports a vehicle 9 to lift its front and rear wheels 9A and 9B above the surface of the first conveyor 1, and comprises a front table 8A on which a cross member 9a transversely extending on a lower under side of the vehicle 9 is supported, and a pair of rear tables 8B which are spaced from each other in the transverse direction of the vehicle 9 and on which the rear axle 9b of the vehicle 9 is supported. (Only one of the rear tables 8B is shown.)

The second conveyor 2 is a double-slat conveyor and is disposed in series with the first conveyor 1 downstream thereof. The second conveyor 2 supports the vehicle 9 on its tires 9A and 9B. The second conveyor 2 comprises a pair of parallel conveyor units 2A and 2B which are driven by a driving mechanism (not shown) in synchronization with the first conveyor 1. The conveyor units 2A and 2B are transversely spaced from each other so that the right front and rear tires are supported on one of the conveyor unit 2A and the left front and rear tires are supported on the other conveyor unit 2B.

The ride-over table 3 is disposed between the first and second conveyors 1 and 2. The ride-over table 3 is for lifting the chassis of the vehicle 9 above the vehicle supporting table means 8 of the first conveyor 1 and delivering the vehicle 9 to the second conveyor 2, and comprises a pair of parallel table units 3A and 3B which are transversely spaced from each other by a distance equal to the distance between the conveyor units 2A and 2B of the second conveyor 2. The receiving side portions or the upstream side portions of the table units 3A and 3B are disposed on opposite sides of the delivery side end or the downstream end of the first conveyor 1 and are inclined downwardly toward the first conveyor 1 to provide ascending slopes to the right front and rear wheels and the left front and rear wheels. On the other hand, the delivery side portions or the downstream side portions of the table units 3A and 3B are disposed above the receiving side end or the upstream end of the second conveyor 2 and are inclined downwardly toward the second conveyor 2 to form descending slopes.

Figure 4:
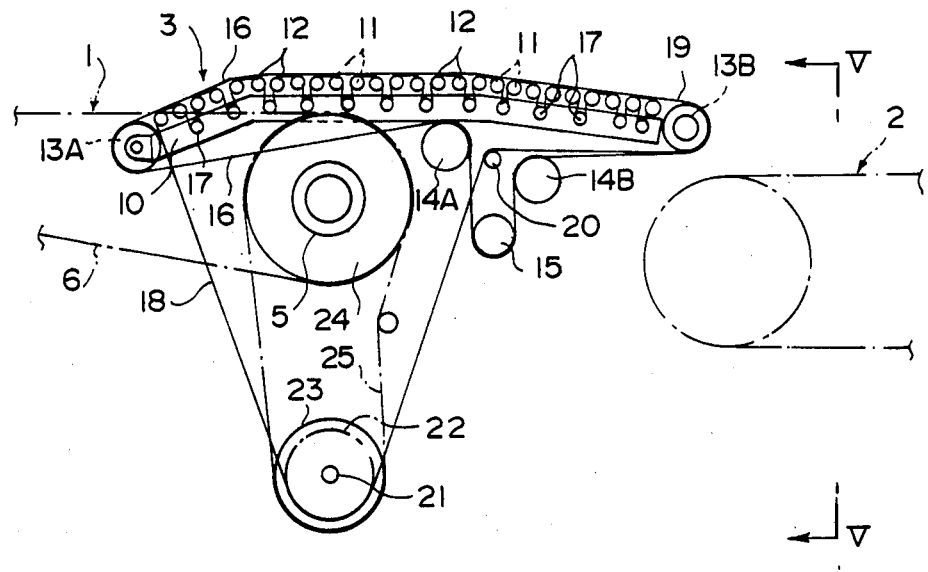
FIG. 4 is a side view of the ride-over table.

As shown in FIGS. 3 and 4, each of the table units 3A and 3B of the ride-over table 3 comprises a plurality of small rollers 11 supported for rotation by a frame 10, and a plurality of sprockets 12 each mounted on the outer end of one of the small rollers 11. Further, a pair of belt rollers 13A and 13B are mounted for rotation on the frame 10 respectively at the receiving side end and the delivery side end.

A belt 16 passed around the small rollers 11, belt rollers 13A and 13B, guide rollers 14A and 14B, and a tension adjustment roller 15.

On the outer side of the frame 10 are mounted for rotation a plurality of sprockets 17, one for every two sprockets 12, for increasing the contact angle of a chain 18 to the sprockets 12. The chain 18 is alternately passed around the sprockets 11 and the sprockets 17 so that the chain 18 is wound around each sprocket 12 at a large contact angle, thereby preventing slip between the sprockets 12 and the chain 18.

Figure 5:
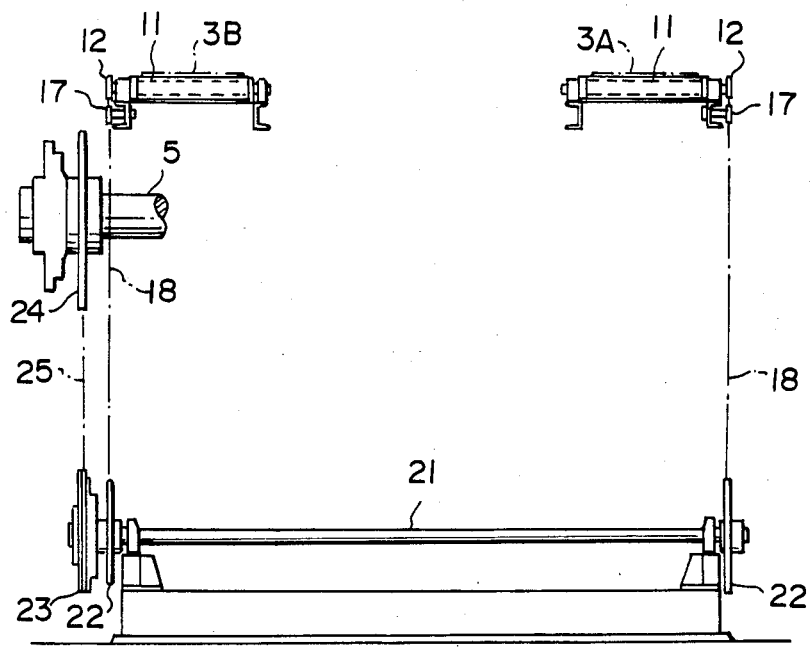
FIG. 5 is a view taken along line V—V in FIG. 4.

A sprocket 19 is mounted on the outer end portion of the shaft of the belt roller 13B mounted on the delivery side end of each of the table units 3A and 3B. Said chain 18 is passed around the sprocket 19, a tension adjustment sprocket 20, and a sprocket 22 which is mounted on each end of a shaft 21 provided below the driving shaft 5 in parallel thereto as shown in FIG. 5. The shaft 21 is further provided with a sprocket 23 mounted thereon on the outer side of one of the sprockets 22 and a sprocket 24 is mounted on the driving shaft 5. A chain 25 is passed around the sprockets 23 and 24. Thus, the belts 16 of the respective table units 3A and 3B are driven in synchronization with the first conveyor 1.

The movable receiving table 4 is arranged to support the front portion of the vehicle 9 transferred to the rideover table 3 and to transfer it to the second conveyor 2. The movable receiving table 4 is disposed between the conveyor units 2A and 2B on the receiving side of the second conveyor 2 to be movable back and forth in a direction parallel to the second conveyor 2.

The movable receiving table 4 comprises a carriage 4A, an up-and-down member 4B mounted on the carriage 4A to be movable up and down, a driving mechanism 4D for moving the up-and-down member 4B, and a running direction changing mechanism 4E for changing the running direction of the carriage 4A between forward and rearward.

The carriage 4A is provided with four rollers 4a1 on opposite sides of the front and rear end portions thereof, and two pairs of rollers 4a2 on the lower surface thereof respectively at the front and rear end portions thereof. The rollers 4a1 are arranged, as shown in FIG. 6, to roll on the upper surfaces of a pair of rails 26 and the roller 4a2 are arranged to roll on the inner side surfaces of the rails 26 when the carriage 4A is moved back and forth.

The up-and-down member 4B comprises, as shown in FIGS. 1 and 2, a receiving seat 4b1 and a pillar portion 4b2 supporting the receiving seat 41. The pillar portion 4b2 is supported for vertical movement by guide rollers 28 provided on upper and lower support plates 27A and 27B which are mounted on opposite sides of the carriage 4A at a rearward portion thereof.

The driving mechanism 4D comprises a driving motor 4d1 and a lifter 4d2 which is moved up and down in response to rotation of the driving motor 4d1 in the regular and reverse directions. Both the driving motor 4d1 and the lifter 4d2 are disposed on a base 30 at the forward ends of arm portions 29 extending obliquely forwardly from the lower support plates 27B and the upper end of the lifter 4d2 is connected to the pillar portion 4b2 of the up-and-down member 4B.

The running direction changing mechanism 4E is disposed on the under side of the front portion of the carriage 4A and comprises, as shown in FIG. 6, a switching cylinder 4e1 and a hook 4e3 connected to the piston rod 4e2 of the cylinder 4e1. The switching cylinder 4e1 is mounted for rotation, by way of a bracket 31, on a supporting member 32 attached to the lower side of the carriage 4A. The hook 4e3 is mounted, by way of a central shaft 33, on the supporting member 32 for seesaw motion.

When the carriage 4A is in the starting position shown in FIG. 1, the hook 4e3 is held in the position shown by the solid line in FIG. 6 in which a first end portion thereof is held horizontally substantially at the height of a forward driving chain 34 and the other or second end portion is retracted upward from the height of a return driving chain 35.

As shown in FIGS. 1 and 2, the forward driving chain 34 is passed around a driving sprocket 36 and a driven sprocket 37 below the conveyor unit 2A of the second conveyor 2.

The driving sprocket 36 is connected to a rotary shaft 39 by way of a pair of bevel gears (not shown) in a bevel gear box 38 as shown in FIG. 6. A chain 41 is passed around a sprocket 40 mounted on the outer end of the rotary shaft 39 and a sprocket 5C mounted on one end of the driving shaft 5 (FIGS. 1 and 2). Thus, the forward driving chain 34 is driven in the direction of arrow $x_1$ in FIG. 2 in synchronization with the first and second conveyors 1 and 2.

As shown in FIGS. 1 and 2, the return driving chain 35 is passed around a driving sprocket 42 and a driven sprocket 43 below the conveyor unit 2B of the second conveyor 2.

The driving sprocket 42 is connected to a rotary shaft 45 by way of a pair of bevel gears (not shown) in a bevel gear box 44 as shown in FIG. 6. A chain 49 is passed around a sprocket 46 mounted on the outer end of the rotary shaft 45 and a sprocket 48 mounted on the output shaft of a returning motor 47. Thus, the return driving chain 35 is driven in the direction of arrow $x_2$ in FIG. 2 at a high speed.

A pair of engagement members 50 are mounted on the forward driving chain 34 to horizontally outwardly extend therefrom spaced from each other in the transfer direction of the chain 34. Each engagement member 50 comprises a pair of pawl members opposed to each other in the transfer direction of the chain 34. Each pawl member is positioned at the height of the first end portion of the hook 4e3 when it is held horizontally as shown by the solid line in FIG. 6. The one of the pawl members of each engagement member 50 forwardly disposed with respect to the transfer direction of the forward driving chain 34 in FIG. 2 is arranged to be pushed over about its base toward the rearward one and is spring-urged toward the original position.

An engagement member 51 is mounted on the return driving chain 35 to horizontally outwardly extend therefrom. The engagement member 51 comprises a pair of pawl members opposed to each other in the transfer direction of the chain 35. Each pawl member is positioned at the height of the second end portion of the hook 4e3 when it is held horizontally as shown by the chained line Y in FIG. 6. The one of the pawl members of the engagement member 51 forwardly disposed with respect to the transfer direction of the return driving chain 35 in FIG. 2 is arranged to be pushed over about its base toward the rearward one and is spring-urged toward the original position. Reference numeral 52 denotes a stopper.

When the vehicle 9 transferred by the first conveyor 1 with the chassis being supported by the vehicle supporting table means 8 and the front and rear tires 9A and 9B being lifted (as shown by chained line A in FIG. 1) reaches the ride-over table 3, the front tires 9A abut against the belts 16 at the inclined portions of the table units 3A and 3B on the receiving side of the ride-over table 3 and are transferred along the ascending slopes of the table units 3A and 3B on the receiving side, whereby the front portion of the vehicle 9 is lifted away from the front table 8A.

Figure 7A:
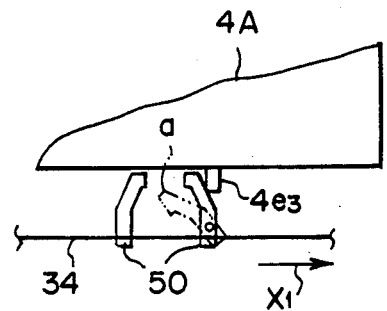
FIGS. 7a and 7b are views for illustrating the operation of the engagement members provided on the forward driving chain.
Figure 7B:
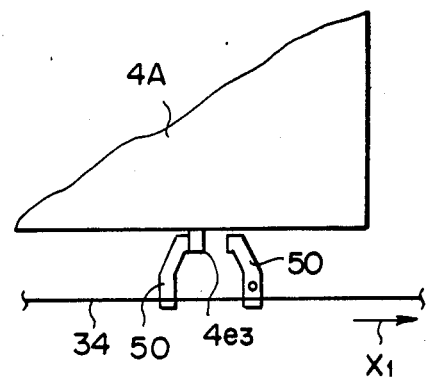

The front portion of the vehicle 9 thus ascends the ascending slope of the ride-over table 3, passes the top surface of the ride-over table 3 and reaches above the receiving seat 4b1 of the up-and-down member 4B of the movable receiving table 4 while being supported on the front tires 9A by the belts 16. At this time, the first end portion of the hook 4e3 of the running direction changing mechanism 4E is inserted between the pawl members of one of the engagement members 50 attached to the forward driving chain 34. That is, as shown in FIG. 7a, the forward one of the pawl members of the engagement member 50 abuts against the first end portion of the hook 4e3 and is pushed down rearwardly as shown by chained line a. Then, after the first end portion of the hook 4e3 passes by the forward pawl member, the forward pawl member returns to the original position under the force of the spring. The first end portion of the hook 4e3 is inserted between the pawl members of the engagement member 50. The rearward pawl member of the engagement member 50 pushes the first end portion of the hook 4e3 when the forward driving chain 34 runs, whereby the movable receiving table 4 is moved in the transfer direction along with the forward driving chain 34.

Simultaneously with initiation of forward movement of the movable receiving table 4, the driving motor 4d1 of the driving mechanism 4D for driving the up-and-down member 4B is actuated to move upward the lifter 4d2 and the receiving seat 4b1 and the pillar 4b2 of the up-and-down member 4B are moved to the raised position shown by chained line b, whereby the front portion of the vehicle 9 is supported by the receiving seat 4b1 and the front tires 9A are lifted from the ride-over table 3 as shown by chained line c.

Since the movable receiving table 4 advances in synchronization with the second conveyor 2, when the receiving seat 4b1 reaches the position shown by chained line d, the rear tires 9B come to be supported by the second conveyor 2 as shown by chained line e. Thereafter, the vehicle 9 is transferred with the front upped until reaching such position that the front tires 9A and the rear tires 9B are in positions respectively shown by chained lines f and g.

When the receiving seat 4b1 of the up-and-down member 4B reaches the position shown by chained line h, the driving motor 4d1 of the driving mechanism 4D rotates in the reverse direction to lower the lifter 4d2, thereby lowering the receiving seat 4b1 to the lowered position shown by chained line i at a delivery position Z. Thus, the front tires 9A are placed on the second conveyor 2 or transferred from the receiving seat 4b1 to the second conveyor 2 at the delivery position Z.

At this time, the rear wheels 9B are in the position shown by chained line k on the second conveyor 2, and thereafter, the vehicle 9 is transferred with the front and rear wheels 9A and 9B supported on the second conveyor 2.

When the movable receiving table 4 reaches the delivery position Z, the switching cylinder 4e1 of the running direction changing mechanism 4E is operated to lift the piston rod 4e2, whereby the hook 4e3 is moved to the position shown by the chained line Y in FIG. 6 in which the first end portion is retracted from between the pawl members of the engagement member 50 and the second end portion is held horizontally, and the movable receiving table 4 is stopped.

Figure 8A:
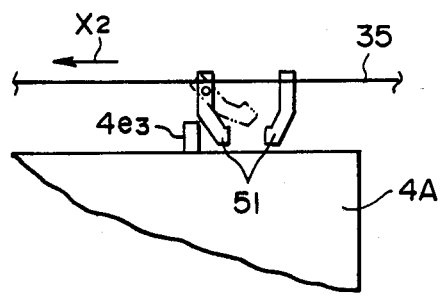
FIGS. 8a and 8b are views for illustrating the operation of the engagement member provided on the return driving chain.
Figure 8B:
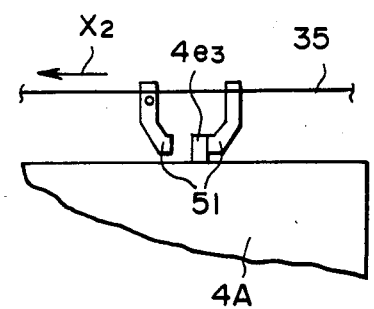

When the second end portion of the hook 4e3 is held horizontally, the second end portion of the hook 4e3 is inserted into the pawl members of the engagement member 51 on the return driving chain 35 in the manner similar to the first end portion as shown in FIGS. 8a and 8b.

When the returning motor 47 is energized and the return driving chain 35 is transferred, the rearward pawl member of the engagement member 51 pushes the second end portion of the hook 4e3 and the movable receiving table 4 is quickly returned to the waiting position shown by the solid line in FIG. 1 from the delivery position Z.

Simultaneously with return of the movable receiving table 4 to the waiting position, the hook 4e3 of the running direction changing mechanism 4E is returned to the position shown by the solid line in FIG. 6.

The above operation is repeated to transfer vehicles from the first conveyor 1 to the second conveyor 2 and each vehicle is delivered by the movable receiving table 4 to the second conveyor 2 at the delivery position Z which is fixed. Therefore, the vehicles can be transferred from the first conveyor 1 to the second conveyor 2 at fixed intervals.

We claim:

1. A vehicle transfer system comprising a first conveyor which transfers a vehicle while supporting the vehicle on its chassis with the tires being floated, a second conveyor which is disposed in series with the first conveyor downstream thereof and transfers the vehicle body while supporting the vehicle on its tires, and a ride-over table disposed between the first and second conveyors which the tires of the vehicle are caused to ride over so that the chassis is lifted away from the vehicle supporting table of the first conveyor, wherein the improvement comprises a movable receiving table which is disposed on the receiving side of the second conveyor to be movable back and forth in parallel to the second conveyor and is moved forward in synchronization with the first conveyor, the movable receiving table being further movable between a raised position in which it lifts the vehicle riding over the ride-over table before the vehicle reaches the delivery side end of the ride-over table and a lowered position in which it lowers the vehicle passing over the ride-over table onto the second conveyor.

2. A vehicle transfer system as defined in claim 1 in which at least the part of the ride-over table at which the tires of the vehicle ride over the ride-over table is formed of a third conveyor which runs in synchronization with the first conveyor so that the tires cannot roll on the ride-over table.

3. A vehicle transfer system as defined in claim 2 in which said third conveyor is driven by a driving means for driving the first conveyor.

4. A vehicle transfer system as defined in claim 3 in which said third conveyor is formed of a belt passed around a plurality of rollers.

5. A vehicle transfer system as defined in claim 4 in which said belt is driven by a chain passed around sprockets formed on said rollers, the chain being arranged to be driven by a driving means for driving the first conveyor.

6. A vehicle transfer system as defined in claim 5 further comprising a plurality of sprockets for adjusting the contact angle of the chain to the sprockets formed on the rollers.

7. A vehicle transfer system as defined in claim 1 in which said movable receiving table is moved forward by a forward driving chain which is driven by a driving means for driving the first conveyor.

8. A vehicle transfer system as defined in claim 7 further comprises an engagement means for selectively connecting the movable receiving table with the forward driving chain and disconnecting the same therefrom.

9. A vehicle transfer system as defined in claim 8 further comprising a return driving chain which is driven by an electric motor to return the movable receiving table to the original position, said engagement means being arranged to connect the movable receiving table to the return driving chain when it is disconnected from the forward driving chain.

* * * * *